United States Patent [19]

Pischke et al.

[11] Patent Number: 4,560,736

[45] Date of Patent: Dec. 24, 1985

[54] WATER-THINNABLE COATING COMPOSITIONS FROM AMINOALKYL CARBOXYLATE HYDROHALIDE POLYMERS

[75] Inventors: James W. Pischke, Midland, Mich.; Russell T. McFadden, Freeport, Tex.; Ruben L. Krause, Angleton, Tex.; Charles H. Moore, Lake Jackson, Tex.

[73] Assignee: The Dow Chemical Company, Midland, Mich.

[21] Appl. No.: 493,410

[22] Filed: May 11, 1983

[51] Int. Cl.$^4$ .................. C08F 2/00; C08F 120/34; C08F 126/00
[52] U.S. Cl. ........................... 526/312; 526/87
[58] Field of Search ................ 526/310, 87, 312

[56] References Cited

U.S. PATENT DOCUMENTS

| | | | |
|---|---|---|---|
| 3,206,421 | 9/1965 | Victorious et al. | 526/87 |
| 3,219,611 | 11/1965 | Witwer | 526/310 |
| 3,341,505 | 9/1967 | Gander | 526/310 |
| 3,404,114 | 10/1968 | Snyder et al. | 526/87 |
| 3,541,037 | 11/1970 | Finn et al. | 526/87 |
| 3,843,585 | 10/1974 | Kangas et al. | 526/310 |
| 3,950,398 | 4/1976 | Klein | 526/310 |

*Primary Examiner*—Joseph L. Schofer
*Assistant Examiner*—Peter F. Kulkosky

[57] ABSTRACT

Water-dispersible polymers of an acid salt of 2-aminoalkyl esters of monounsaturated monocarboxylic acid and at least one comonomer are prepared by dissolving the salt of that ester in a coupling solvent, mixing the comonomers as a separate feedstock and bringing the monomers together in a polymerization zone at a controlled rate so that the monomers remain in solution and polymerizing to substantial completion.

11 Claims, No Drawings

WATER-THINNABLE COATING COMPOSITIONS FROM AMINOALKYL CARBOXYLATE HYDROHALIDE POLYMERS

BACKGROUND OF THE INVENTION

Water-dispersible epoxy resin coating compositions have been prepared using aminoethylated vinyl polymers acidified with hydrochloric acid, hydrobromic acid or mixtures thereof. Such polymers having primary aminoalkyl groups are shown in U.S. Pat. Nos. 3,719,629; 4,272,621 and 4,353,819. The polymers having tertiary amino groups are shown in U.S. Pat. No. 4,217,261.

The polymers having primary aminoalkyl groups have heretofore been prepared by aminoalkylating a carboxylic acid-containing polymer with an alkyleneimine. That has required a three-step process of making the polymer, aminoalkylating the carboxyl groups and making the hydrohalide salt. Alkylene imines are troublesome to work with in production quantities. They are also toxic materials requiring that any residual imine be completely removed.

Polymers have been made from aminoalkyl acrylates and methacrylates by copolymerization with other ethylenically unsaturated comonomers.

SUMMARY OF THE INVENTION

The invention is a process for preparing water-compatible polymers by polymerizing an acid salt of a 2-aminoethyl or 2-aminopropyl ester of a monounsaturated monocarboxylic acid with at least one other comonomer. The process involves dissolution of the aminoalkylester salt in a coupling solvent and the blending of comonomers, then feeding the two monomer streams into a polymerization site at a rate that the amount of unpolymerized monomer at that site never exceeds the solubility limits of any of the monomers and continuing feeding and polymerizing the monomers to substantial conversion to polymer.

DETAILED DESCRIPTION OF THE INVENTION

The 2-aminoethyl and 2-aminopropyl esters of methacrylic acid are prepared by known methods. Thus, in British Pat. No. 475,131, the esters can be prepared by reacting methacrylic acid with the appropriate amino alcohol or its alkaline earth or alkali metal alcoholate. In U.S. Pat. No. 3,108,979, it is taught that with primary or secondary amino alcohols a useful process is the reaction of a methacrylyl chloride and a hydrohalide salt of the appropriate alcohol to form the aminoalkyl methacrylate hydrohalide. Yet another procedure is the acidolysis of the appropriate oxazoline having an unsaturated substituent in the 2-position. For example, 2-isopropenyl oxazoline results in 2-aminoethyl methacrylate.

For water compatibility, the aminoalkyl methacrylate is used as the acid halide; either the hydrochloride, the hydrobromide or a mixture of hydrochlorides and hydrobromides. A solution is easily made by simple mixing of the monomer in a suitable water-miscible solvent or solvent blend. Among such solvents are the lower alkyl monoethers of ethylene, propylene, dipropylene and like glycols. Representative species are the butyl ether of propylene glycol, the ethyl ether of ethylene glycol, the propyl ether of diethylene glycol and the methyl ether of dipropylene glycol. Other solvents will be known.

The interpolymers also include one or more copolymerizable monomers such as vinyl aromatic monomers, alkyl and hydroxyalkyl esters of unsaturated monocarboxylic acids having 1 to 6 carbons in the alkyl group, dialkyl esters of unsaturated dicarboxylic acids, acrylonitrile and methacrylonitrile, vinyl and vinylidene halides, N-vinyl pyrrolidone and the like.

Suitable vinyl aromatic monomers include styrene, α-methylstyrene, vinyl toluene, the various alkyl substituted styrenes, the various halo substituted styrenes, vinyl naphthalene and the like. The more preferred of these monomers are styrene, α-methylstyrene and vinyl toluene. Suitable alkyl esters of unsaturated mono- and dicarboxylic acids include the esters prepared from aliphatic alcohols containing from 1 to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Small amounts of acrylonitrile, less than about 10 percent, may also be used to improve the film properties.

The interpolymers preferred herein are those of styrene with one or more acrylate or methacrylate monomers and the vinyl carboxylic acid. In one preferred subgenus the styrene may constitute up to 60 weight percent of the monomers that are interpolymerized with the remainder of the acrylic monomer and the acid. Equally preferred are those interpolymers employing up to 90 weight percent of acrylic monomers.

The interpolymers must have enough aminoalkyl methacrylate hydrohalide to provide water miscibility and that the amino hydrogen content of the interpolymer be between 0.91 and 1.10 weight percent on a dry basis.

Because of the low solubility in the cold of the acid salt of the aminoalkylated polymer in the other comonomers, such as styrene, butyl acrylate and methyl methacrylate, it is necessary to employ an organic coupling solvent.

Those solvents may be alkanols, such as methanol, ethanol, the propanols, the butanols, and tert-amyl alcohol; dioxane; tetrahydrofuran; linear polyethers having boiling points below 175° C., such as 1,2-dimethoxyethane and 1-methoxy-2-ethoxypropane; and the glycol ethers having the structure $(HO-C_2H_3R-O)_n-R'$ in which n can be 1 or 2, R can be hydrogen, methyl or ethyl and R' can be a $C_1$ to $C_6$ straight or branched alkyl chain or phenyl. Mixtures of such solvents with or without water are also within this inventive concept.

The invention is a process that utilizes the organic coupling solvent in an amount and in a manner that the concentration of unpolymerized monomer at no time exceeds the solubility of any of the monomers in that solvent at the polymerization temperature.

In basic essentials, the process is to dissolve the acid salt of the aminoalkyl methacrylate in a minimum amount of coupling solvent, charge the balance of the solvent to the heated reactor, and then feed, as two separate reactant streams, the aminoalkyl polymer salt solution in one stream and the other monomers, as a homogeneous mixture, in the other. Preferably, the flow rates of the two streams will be uniform, and will be monitored closely enough that they begin and finish at approximately the same time.

As the two immiscible liquids are fed into the hot solvent in the reactor, miscibility occurs because of the hot, excess solvent and because the actual concentration of comonomers never rises very high, owing to their rapid conversion to interpolymer resin.

The polymerization temperature may range from about 60° to 140° C. with a preferred range of 80° to 100° C. The optimum temperature will vary depending on the monomers and solvent employed, the catalyst used, the molecular weight desired and other conditions that are known or easily determined by routine preliminary experiment.

Polymerization is induced by free radical catalysis. Such catalysts are well known and include such monomer-soluble materials as, for example, benzoyl peroxide, lauroyl peroxide, azodiisobutyronitrile and other peroxides, azo catalysts, percarbonates, etc.

The catalyst may be dissolved in the comonomer feed and added therewith to the polymerization site. As an alternative, the catalyst could be added as a separate feed to the reaction. The amount of catalyst employed is that typically used in solution polymerization and will generally range from about 0.1 to about 5 weight percent of the monomers.

The reaction should be stirred to assure thorough mixing of the ingredients and to prevent localized runaway polymerizations leading to unacceptable heterogeneity in the polymer.

The acidified polymers of this invention are utilizable as the pigment binder for coating compositions such as gloss enamels. Typically, such enamels will include the pigment binder, pigment and a liquid dispersing medium. The enamels may also include other materials commonly employed in such compositions such as extender pigments, viscosity adjusting agents, preservatives and the like.

In addition to gloss and semi-gloss enamels, the polymers may be employed in maintenance enamels, floor enamels, seamless flooring coatings, aircraft finishes, clear finishes and exterior house paints and trim enamels.

The coating compositions of this invention may be employed as formulated without pigments, or if colored coatings are desired, they may be added without detracting from the scope of the present invention.

The interpolymers of this invention may be used with epoxy resins to obtain crosslinked coatings exhibiting the desirable properties of such compositions.

Water-dispersible or water-thinnable epoxy resin coatings can be prepared by mixing the acidified aminoethylated interpolymers and the water-soluble aliphatic alcohol and glycol ether solvents discussed above with the desired epoxy resin.

The water-dispersible epoxy resin compositions of this invention may be conveniently formulated as two package or component systems wherein one package comprises the acidified aminoethylated polymer, water-miscible solvents, water and, if desired, pigments, leveling agents, antifoam agents and other modifiers and the second package or component comprises the epoxy resin and, if desired, suitable water-miscible solvents. Alternatively, the second package can consist of a pigmented or nonpigmented emulsion of epoxy resin in water. When it is desired to apply the coating to the desired substrate, the contents of the two packages are blended together and the resultant mixture applied to the substrate by brushing, spraying, etc. The containers and applicator are then easily cleaned by washing with warm water.

A wide variety of polyepoxide resins may be readily made or are commercially available to prepare the coating compositions. One of the preferred classes of epoxy resins include the glycidyl polyethers of polyhydric phenols such as 4,4′-isopropylidene diphenol, commonly called bisphenol A. Other polyhydric phenols include resorcinol, catechol, hydroquinone, p,p′-dihydroxydiphenyl, p,p′-dihydroxy phenyl sulfone and the like. Flame retardant or self-extinguishing resins can be readily made from the halogen substituted, preferably bromine substituted, polyhydric phenols. The resins are generally made by reacting an epihalohydrin with the polyhydric phenol in the presence of a strong base. Typically, these resins contain more than one oxirane group,

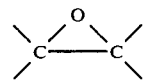

per molecule and the epoxide equivalent weight is defined as the weight in grams of the resin which contains one gram equivalent of epoxide.

Other polyepoxide resins which contain more than one epoxide group per molecule are glycidyl polyethers of polyhydric alcohols, glycidyl polyethers of novolac resins (commonly called epoxy novolacs) and a variety of resins wherein the epoxide group is introduced into the resin by the epoxidation of double bonds. The glycidyl polyethers of polyhydric phenols and polyhydric alcohols having an epoxide equivalent weight from about 150 to 2000 are preferred.

In addition to the polyepoxide resins described, vinyl polymers containing pendant glycidyl groups may also be utilized in this invention. Such vinyl glycidyl polymers may be made by copolymerizing a wide variety of vinyl monomers with a monomer such as glycidyl methacrylate. Suitable vinyl monomers include those which do not contain a group reactive with the glycidyl group and preferably include the $\alpha,\beta$-ethylenically unsaturated carboxylic acid esters of saturated alcohols containing from 1 to about 8 carbon atoms and the monovinyl aromatic monomers of the benzene class such as styrene, vinyl toluene and the like. Preferably, the polymer contains from about 5 to about 50 percent by weight of the vinyl glycidyl monomer. Other suitable vinyl glycidyl monomers include allyl glycidyl ether, glycidyl acrylate, diglycidyl maleate and the like.

The epoxy resin coating compositions may vary considerably in solids content ranging from about 1 percent up to 40 or 50 weight percent depending upon the particular applications.

The epoxy resin coatings may be air dried at ambient temperatures or may be baked by conventional methods to harden and insolubilize them. It is a unique advantage of the aminoalkylated interpolymers as acidified herein that they cure epoxy resins under cool and damp conditions such as those that are encountered from time to time in applying exterior coatings. Interpolymers acidified only with hydrochloric acid or with mixtures with substantially less than 70 mole percent hydrobromic acid provide acceptable cure rates with epoxy resins only under favorable ambient conditions. That disadvantage limits the utilization of coating compositions in exterior applications.

The compositions of this invention also have acceptable application viscosity and as coatings show minimal flash rusting over unprimed steel and adequate resistance to corrosion, to solvents, to chemical attack and to ultraviolet light. Certain of them give no flash rusting whatsoever over unprimed steel.

The inventive concept will be more apparent from the following illustrative examples wherein all parts and percentages are by weight.

EXAMPLE 1

To a 500 ml spherical flask fitted for reflux, temperature control, $N_2$ purging and two continuous monomer additions was charged 110 g of i-propyl alcohol, and this was heated to 85° C. with stirring. To a feed reservoir was charged 96.2 g of the aqueous 2-AEM.HCl solution and to a second feed reservoir, the monomer-/AIBN mixture of n-butyl acrylate, methyl methacrylate and styrene. Both feed streams were begun simultaneously and were monitored so that both feeds were completed at about the same time. Post-addition of AIBN and extended heating at 85° C. were also carried out. The finished polymer solution had the following properties: 42 weight percent nonvolatiles; 10,000 cps (10 pascal seconds) viscosity at 25°; clear and dark-colored appearance; and 1.31 meq/g amine hydrogen equivalent strength.

EXAMPLES 2-4

In the same manner as in Example 1, a number of other interpolymers were prepared as outlined in Table I(a). An aminoethylated polymer sold commercially as XD-7080 by The Dow Chemical Company was used as a control. Details of the interpolymers are shown in Table I(b).

To evaluate the interpolymers as coatings, each was diluted with water, then mixed with two diglycidyl ether resins, one aromatic and one aliphatic, and with a glycol ether solvent. The amounts by weight in grams used, and the resulting mixture properties are given in Table II. In appearance, all of the mixtures were creamy, white to tan emulsions.

The aromatic epoxy resin was a diglycidyl ether of bisphenol A having an epoxy equivalent weight of 182-190 and sold commercially as D.E.R. ® 331 epoxy resin by The Dow Chemical Company.

The aliphatic epoxy resin was a diglycidyl ether of a polypropylene oxide sold commercially as D.E.R. ® 732 epoxy resin by The Dow Chemical Company.

The glycol ethers used were the monoethyl ether of ethylene glycol (DOWANOL ® EE) and the monomethyl ether of dipropylene glycol (DOWANOL ® DPM) both sold commercially by The Dow Chemical Company.

Each coating mixture was cast as a thin film on phosphatized steel panels, and these were allowed to dry and harden at 25°–30° C. for one week before they were evaluated. The results of the evaluation are presented in Table III. The results show that the films are equal or superior to those of the control.

TABLE II

| COATING FORMULATIONS | | | |
|---|---|---|---|
| Component in Mixture | Weight of Component in Formulation Made with Resin No. (Grams) | | |
| | 2 | 3 | Control |
| Polymer Soln. | 29.2 | 26.4 | 25.0 |
| $H_2O$ | 33.3 | 31.0 | 37.8 |
| D.E.R. 331* | 9.3 | 9.3 | 9.3 |
| D.E.R. 732* | 1.7 | 1.7 | 1.7 |
| DOWANOL DPM* | 2.0 | 2.0 | 2.0 |
| DOWANOL EE* | 0 | 2.9 | 0 |
| | Properties of the Above Formulations | | |
| pH | 2.1 | 4.2 | 5.3 |
| Viscosity (poise) | 1.8 | 13. | 22. |
| Solids, % | 31. | 31. | 31. |
| Cosolvent[1], % | 17 | 17 | 17 |

[1]Solvent other than water.
*Trademark of The Dow Chemical Company

TABLE III

| Property of Cured Coating | 2 | 3 | Control |
|---|---|---|---|
| Gloss, 60°, % | 82 | 100 | 97 |
| Humidity Resistance, % | 38 | 42 | 24 |
| Impact, in. lb., face/back | 20/<5 | 70/40 | 20/<5 |
| Hardness (KHN) | 21 | 20 | 24 |
| Solvent Resistance | Good | Good | Good |
| Adhesion | Fair | Good | Good |

TABLE I

| Example No. | AEM.HCl Solution | Composition in Grams In Monomer | | | | | Percent Solids | Percent Conversion | Viscosity (Poise) | pH | AHE (meq/g)[4] | | Description |
|---|---|---|---|---|---|---|---|---|---|---|---|---|---|
| | | Feed Stream | | In Flask | | | | | | | Exp'd | Act. | |
| | | EE[3] | PrOH[3] | EE[3] | PrOH[3] | $H_2O$ | | | | | | | |
| 2 | 98.3[1] | — | — | — | 61 | — | 49 | 94 | — | — | 1.58/3.10 | 1.43/3.66 | Very turbid, pink, poor water solubility |
| 3 | 134.3[1] | — | — | 90 | — | — | 44 | 99 | 380 | — | 1.72/3.85 | — | Slightly turbid, light amber |
| 4 | 130.0[2] | — | — | 90 | — | — | 44 | 96 | 2200 | — | 1.80/3.97 | — | Moderately turbid, light amber |
| XD-7080 Control | — | — | — | — | — | — | 49 | — | 55 | 5.3 | — | 2.00/4.08 | Clear, medium amber |

[1]32.3 weight percent AEM.HCl in water.
[2]33.8 weight percent AEM.HCl in water.
[3]EE is 2-ethoxyethanol, PrOH is 2-propanol.
[4]Solution basis/polymer basis.

What is claimed is:

1. A process for preparing water-dispersible polymers from an acid salt of a primary aminoalkyl ester of a monounsaturated monocarboxylic acid and at least one other ethylenically unsaturated comonomer, said process comprising (a) dissolving said acid in a water-miscible coupling solvent to form a first monomer solution, (b) mixing said comonomers to form a second monomer material, (c) bringing said first monomer solution and said second monomer material together at a polymerization rate controlled to that at which interpolymerization proceeds and at which the concentration of unpolymerized monomers is maintained at a level to maintain a solution, (d) adding said monomer stream (a) and monomer stream (b) continuously, and at rates such that the completion of addition of both streams is simultaneous, and (e) polymerizing to substantial completion.

2. The process of claim 1 wherein said aminoalkyl ester is a 2-aminoethyl ester.

3. The process of claim 2 wherein said ester is the 2-aminoethyl ester of methacrylic acid.

4. The process of claim 1 wherein said unsaturated comonomer is an alkyl acrylate or alkyl methacrylate.

5. The process of claim 1 wherein said unsaturated comonomer is an alkenyl aromatic monomer.

6. The process of claim 5 wherein said alkenyl aromatic monomer is styrene.

7. The process of claim 1 wherein the total amount of coupling solvent is at least that amount that will dissolve all the monomers.

8. The process of claim 7 wherein said solvent is a monoalkyl ether or monophenyl ether of a lower alkylene glycol or dialkylene glycol.

9. The process of claim 8 wherein said alkylene glycol is ethylene glycol.

10. The process of claim 8 wherein said alkylene glycol is propylene glycol.

11. The process of claim 7 wherein a part of said solvent is employed in step (a) to dissolve the aminoalkyl carboxylate and the remainder is added to the polymerization site.

* * * * *